(12) United States Patent
Sato et al.

(10) Patent No.: US 8,432,964 B2
(45) Date of Patent: Apr. 30, 2013

(54) IMAGE PROCESSING DEVICE, METHOD, AND PROGRAM

(75) Inventors: Kazushi Sato, Minato-ku (JP); Junichi Tanaka, Minato-ku (JP); Yiwen Zhu, Minato-ku (JP); Yoichi Yagasaki, Tokyo (JP)

(73) Assignee: Sony Corporation, Tokyo (JP)

( * ) Notice: Subject to any disclaimer, the term of this patent is extended or adjusted under 35 U.S.C. 154(b) by 1042 days.

(21) Appl. No.: 12/305,203

(22) PCT Filed: Jul. 13, 2007

(86) PCT No.: PCT/JP2007/063950
§ 371 (c)(1),
(2), (4) Date: Dec. 17, 2008

(87) PCT Pub. No.: WO2008/007759
PCT Pub. Date: Jan. 17, 2008

(65) Prior Publication Data
US 2009/0207907 A1 Aug. 20, 2009

(30) Foreign Application Priority Data
Jul. 14, 2006 (JP) .................... 2006-193672

(51) Int. Cl.
*H04N 7/12* (2006.01)
*H04B 1/66* (2006.01)
(52) U.S. Cl.
USPC ..................... 375/240.01; 375/240
(58) Field of Classification Search ............. 375/240.01, 375/240
See application file for complete search history.

(56) References Cited

U.S. PATENT DOCUMENTS

| | | | | |
|---|---|---|---|---|
| 5,588,075 A | * | 12/1996 | Chiba et al. | 382/239 |
| 6,067,323 A | * | 5/2000 | Imura | 375/240 |
| 6,658,157 B1 | * | 12/2003 | Satoh et al. | 382/239 |

(Continued)

FOREIGN PATENT DOCUMENTS

| | | |
|---|---|---|
| JP | 5-83560 | 4/1993 |
| JP | 2000-13802 | 1/2000 |

(Continued)

OTHER PUBLICATIONS

Siwei MA, et al., "Rate Control for JVT Video Coding Scheme With HRD Considerations", ICIP, vol. 3, pp. 793-796,2003.

(Continued)

*Primary Examiner* — Techane Gergiso
(74) *Attorney, Agent, or Firm* — Oblon, Spivak, McClelland, Maier & Neustadt, L.L.P.

(57) ABSTRACT

The present invention relates to an image processing apparatus and a method and a program that enable an amount of code to be suppressed below a desired value with more reliability. An emergency mode determining section 142 determines that the amount of code of a next picture is likely to exceed an upper limit if a target bit calculated by a rate controlling section 118 exceeds a predetermined upper limit. If it is determined that the amount of code of the next picture is likely to exceed the upper limit, the code amount controlling section 142 controls an orthogonal transducing section 114 to replace a transform coefficient of a predetermined frequency component with zero, controls an intra predicting section 125 to restrict intra prediction modes to be applied, and controls a mode determining section 127 to restrict inter prediction modes to be applied. The prevent invention can be applied to an encoding apparatus.

14 Claims, 4 Drawing Sheets

U.S. PATENT DOCUMENTS

| | | | |
|---|---|---|---|
| 6,819,714 B2 * | 11/2004 | Yamada et al. | 375/240.12 |
| 7,593,462 B2 * | 9/2009 | Shimada et al. | 375/240.03 |
| 2002/0085636 A1 * | 7/2002 | Uenoyama et al. | 375/240.12 |
| 2003/0202706 A1 * | 10/2003 | Uchibayashi et al. | 382/236 |
| 2005/0084168 A1 * | 4/2005 | Fukuhara et al. | 382/240 |
| 2005/0089096 A1 * | 4/2005 | Sato et al. | 375/240.12 |
| 2005/0147162 A1 * | 7/2005 | Mihara | 375/240.03 |
| 2006/0013299 A1 * | 1/2006 | Sato et al. | 375/240.03 |
| 2008/0101457 A1 * | 5/2008 | Toma et al. | 375/240.01 |

FOREIGN PATENT DOCUMENTS

| | | |
|---|---|---|
| JP | 2000-152251 | 5/2000 |
| JP | 2002-10260 | 1/2002 |
| JP | 2002-010271 | 1/2002 |
| JP | 2003-284075 | 10/2003 |
| JP | 2003 348588 | 12/2003 |
| JP | 2003-348588 | 12/2003 |
| JP | 2003348588 A * | 12/2003 |
| JP | 2004 165894 | 6/2004 |
| JP | 2004-320437 | 11/2004 |
| JP | 2005-86249 | 3/2005 |
| JP | 2005-151017 | 6/2005 |
| JP | 2005-160048 | 6/2005 |
| JP | 2005-175903 | 6/2005 |
| JP | 2005-311502 | 11/2005 |
| JP | 2005-328183 | 11/2005 |
| JP | 2006-60836 | 3/2006 |
| JP | 2006-186972 | 7/2006 |
| WO | WO 2006/082690 A1 | 8/2006 |

OTHER PUBLICATIONS

Office Action issued Aug. 16, 2011, in Japanese Patent Application No. 2006-193672.

Office Action issued Jan. 4, 2011, in Japan Patent Application No. 2006-193672.

Office Action issued Jan. 26, 2012 is Japanese Application No. 2010-157761.

* cited by examiner

IMAGE PROCESSING DEVICE, METHOD, AND PROGRAM

TECHNICAL FIELD

The present invention relates to an image processing apparatus and a method and a program, and in particular, relates to an image processing apparatus and a method and a program that enable an amount of code to be suppressed below a desired value with more reliability.

BACKGROUND ART

In a system that encodes an image in accordance with an H.264/AVC (Advanced Video Coding) system, an upper limit of an amount of code per picture is set in accordance with conditions such as an HRD (Hypothetical Reference Decoder) buffer capacity, a network bandwidth, a system layer constraint, and a readout performance of a disk drive. If an amount of code exceeds the upper limit, operation of a system may malfunction. Accordingly, there have conventionally been proposed various methods for controlling an amount of code in an encoding apparatus that encodes an image in accordance with an H.264/AVC system (e.g., see Patent Document 1).

Patent Document 1: Japanese Patent Application Laid-Open 2004-165894

DISCLOSURE OF INVENTION

Technical Problem

However, for example, in the case where an image including white noise is input, there is a possibility that an amount of code exceeds an upper limit by conventional control based on a rate control method defined in an MPEG-2 Test Model 5 (TM5).

The present invention has been made in view of the above situation, and enables an amount of code to be suppressed below a desired value with more reliability.

Technical Solution

An image processing apparatus according to one aspect of the invention, in the image processing apparatus for encoding an image in accordance with an MPEG (Moving Picture Coding Experts Group) 4 system or an H.264/AVC (Advanced Video Coding) system, includes determination means for determining whether or not an amount of code per picture controlled by first code amount control means for controlling a bit rate is likely to exceed a predetermined upper limit, and second code amount control means for controlling encoding to suppress the amount of code in accordance with a method different from that of the first code amount control means if it is determined that the amount of code per picture is likely to exceed the upper limit.

The determination means can determine whether or not the amount of code per picture is likely to exceed the predetermined upper limit, based on an amount of code allocated to each picture by the first code amount control means.

The second code amount control means can perform control to replace, with zero, a transform coefficient of a predetermined frequency component among transform coefficients obtained by performing an orthogonal transform on a macroblock in a difference image which is a difference between an original image and a prediction image.

The second code amount control means can perform control to replace a transform coefficient of a frequency component excluding a direct-current component with zero.

The second code amount control means can perform control so as to replace transform coefficients of all frequency components including a direct-current component with zero.

The second code amount control means can perform control to change a frequency component range in which a transform coefficient is replaced with zero, based on an amount of code allocated to each picture by the first code amount control means.

The second code amount control means can perform control to change a frequency component range in which a transform coefficient is replaced with zero, based on a type of a slice to which a macroblock belongs.

The second code amount control means can control a prediction mode which is applied to generate a prediction image.

The second code amount control means can perform control for applying a same prediction direction to each block which is a unit for performing an intra prediction.

The second code amount control means can perform control for applying a DC mode to each block.

The second code amount control means can perform control for applying an intra 16×16 mode, in an intra prediction of a luminance signal.

The second code amount control means can control a size of a block which is a unit for performing the intra prediction, based on the type of the slice to which a macroblock belongs.

The second code amount control means can perform control for applying a skip mode as a prediction mode for a macroblock belonging to a P slice.

The second code amount control means can perform control for applying a skip mode or a direct mode as a prediction mode for a macroblock belonging to a B slice.

An image processing method according to one aspect of the invention, in the image processing method for encoding an image in accordance with an MPEG (Moving Picture Coding Experts Group) 4 system or an H.264/AVC (Advanced Video Coding) system, includes the steps of determining whether or not an amount of code per picture controlled by code amount control means for controlling a bit rate is likely to exceed a predetermined upper limit, and controlling encoding to suppress the amount of code in accordance with a method different from that of the code amount control means if it is determined that the amount of code per picture is likely to exceed the upper limit.

A program according to one aspect of the invention, in the program for allowing a computer to execute image processing for encoding an image in accordance with an MPEG (Moving Picture Coding Experts Group) 4 system or an H.264/AVC (Advanced Video Coding) system, includes the steps of determining whether or not an amount of code per picture controlled by code amount control means for controlling a bit rate is likely to exceed a predetermined upper limit, and controlling encoding to suppress the amount of code in accordance with a method different from that of the code amount control means if it is determined that the amount of code per picture is likely to exceed the upper limit.

According to one aspect of the invention, it is determined whether or not an amount of code per picture controlled by code amount control means for controlling a bit rate is likely to exceed a predetermined upper limit, and encoding is controlled to suppress the amount of code in accordance with a method different from that of the code amount control means if it is determined that the amount of code per picture is likely to exceed the upper limit.

Advantageous Effects

According to one aspect of the invention, the amount of code is suppressed. Further, according to one aspect of the invention, the amount of code can be suppressed below a desired value with more reliability.

EXPLANATION OF REFERENCE NUMERALS

101—Image processing apparatus, 114—Orthogonal transducing section, 115—Quantizing section, 118—Rate controlling section, 119—Emergency mode controlling section, 125—Intra predicting section, 126—Motion predicting/compensating section, 127—Mode determining section, 141—Emergency mode determining section, 142—Code amount controlling section

BEST MODE FOR CARRYING OUT THE INVENTION

Hereinafter, an embodiment of the present invention will be described with reference to the accompanying drawings.

Figure 1:
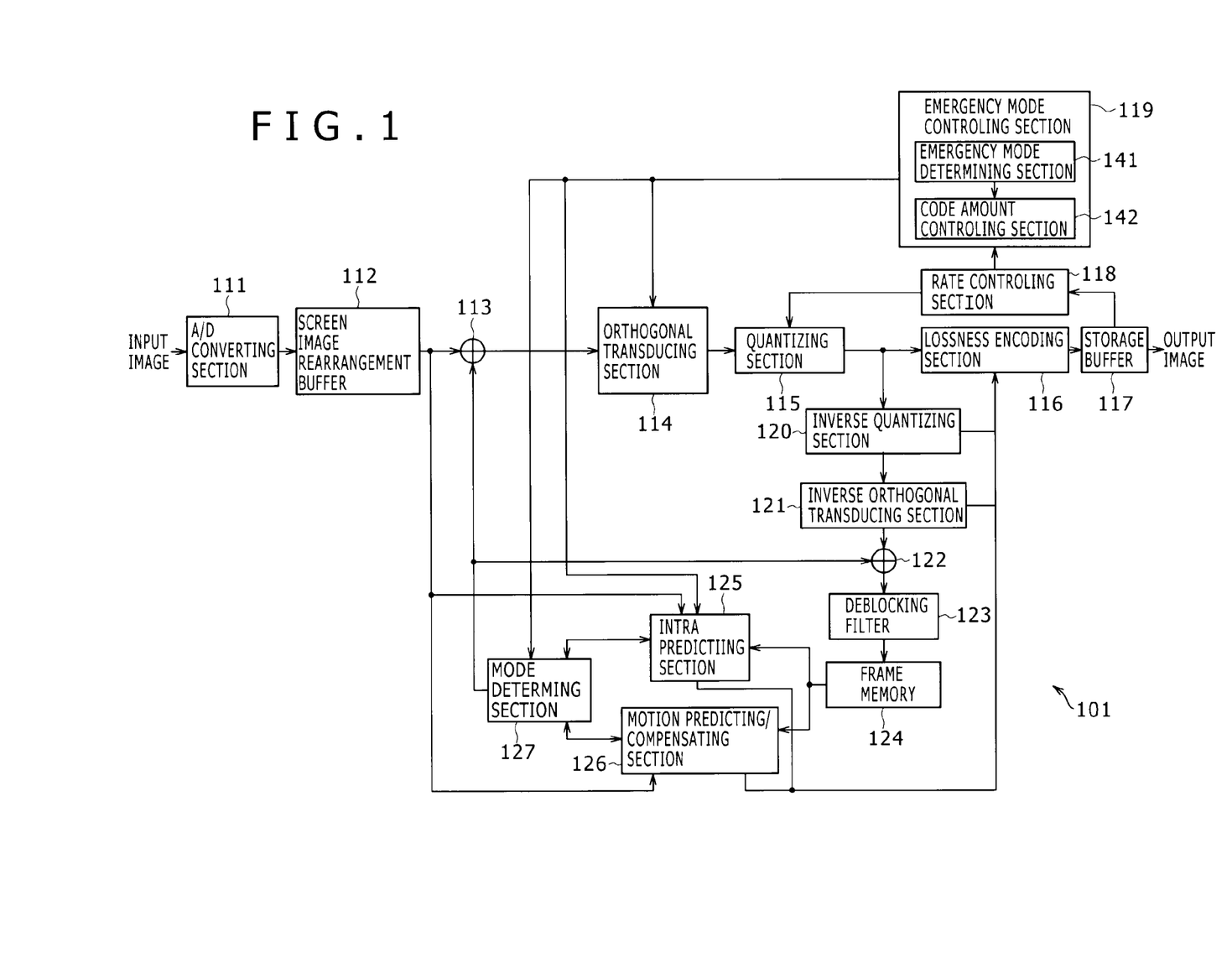
FIG. 1 is a block diagram showing an embodiment of an image processing apparatus to which the invention is applied.

FIG. 1 is a block diagram showing a configuration of an embodiment of an image processing apparatus to which the invention is applied.

An image processing apparatus 101 is an apparatus that encodes an input image in accordance with an H.264/AVC (Advanced Video Coding) system and outputs the encoded image, for example, to a recording apparatus, a transmission line, or the like, which is arranged on a subsequent stage, not shown in drawings.

The image processing apparatus 101 is configured to include an A/D (Analog/Digital) converting section 111, a screen image rearrangement buffer 112, an adder 113, an orthogonal transducing section 114, a quantizing section 115, a lossless encoding section 116, a storage buffer 117, a rate controlling section 118, an emergency mode controlling section 119, an inverse quantizing section 120, an inverse orthogonal transducing section 121, an adder 122, a deblocking filter 123, a frame memory 124, an intra predicting section 125, a motion predicting/compensating section 126, and a mode determining section 127. Further, the emergency mode controlling section 119 is configured to include an emergency mode determining section 141 and a code amount controlling section 142.

The A/D converting section 111 A/D-converts an analog image input from an outside into a digital image, and supplies the converted digital image (hereinafter also referred to as an original image as appropriate) to the screen image rearrangement buffer 112.

The screen image rearrangement buffer 112 rearranges original images supplied from the A/D converting section 111, based on a GOP (Group Of Pictures) structure, and supplies them in order to the adder 113, the intra predicting section 125, and the motion predicting/compensating section 126.

The adder 113 acquires, from the mode determining section 127, either an intra prediction image predicted using an intra prediction (intra-frame prediction) on each macroblock in the original image or an inter prediction image predicted using an inter prediction (inter-frame prediction, motion-compensating prediction). The adder 113 finds a difference for each macroblock between the original image and the intra prediction image or the inter prediction image, and supplies a difference image composed of prediction errors obtained by finding the difference to the orthogonal transducing section 114.

The orthogonal transducing section 114 performs, on each block of a predetermined size in the difference image, an orthogonal transform such as a discrete cosine transform or a Karhunen-Loeve transform, and supplies a transform coefficient thereby obtained to the quantizing section 115. Further, as will be described later with reference to FIG. 3, in an emergency mode in which an amount of code per picture is likely to exceed a predetermined upper limit, the orthogonal transducing section 114 replaces a value of the transform coefficient of a predetermined frequency component with zero, under the control of the emergency mode section 126.

The quantizing section 115 quantizes the transform coefficient supplied from the orthogonal transducing section 114, using a quantization scale controlled by the rate controlling section 118, and supplies the quantized transform coefficient to the lossless encoding section 116 and the inverse quantizing section 120.

The lossless encoding section 116 acquires information on the intra prediction from the intra predicting section 125, and acquires information on the inter prediction from the motion predicting/compensating section 126. The lossless encoding section 117 arranges the quantized transform coefficient, the information on the intra prediction, the information on inter prediction, etc. in a predetermined order, and performs, on the arranged data, lossless encoding processing including variable length coding such as CAVLC (Context-Adaptive Variable Length Coding), arithmetic coding such as CABAC (Context-Adaptive Binary Arithmetic Coding) or the like. The lossless encoding section 116 supplies the encoded data to the storage buffer 117 for storage.

The storage buffer 117 outputs the data, as an image encoded with the H.264/AVC system, supplied from the lossless encoding section 116 to a recording apparatus, a transmission line, or the like, which is arranged on the subsequent stage, not shown in drawings.

Based on the amount of code of the image stored in the storage buffer 117, the rate controlling section 118 controls a bit rate which is an amount of code per time allocated to an image to be encoded.

For example, the rate controlling section 118 controls a bit rate by controlling a value of a quantization scale being a value by which the quantizing section 115 divides the transform coefficient in quantization, using a rate control method defined in an MPEG-2 Test Model 5 (TM5). Further, the rate controlling section 118 calculates a target bit which is an estimate value of an amount of code allocated to an image (picture) to be encoded next, and supplies information indicating the calculated target bit to the emergency mode controlling section 119.

The emergency mode controlling section 119 performs processing concerning an emergency mode.

The emergency mode determining section 141 among elements constituting the emergency mode controlling section 119 determines whether or not an amount of code per picture of an image (picture) to be encoded next is likely to exceed a predetermined upper limit, based on the target bit acquired from the rate controlling section 118. The emergency mode determining section 141 supplies information indicating the determination result to the code amount controlling section 142.

Note that the upper limit of the amount of code per picture is set based on conditions such as an HRD buffer capacity, a network bandwidth, a system layer constraint, and a readout performance of a disk drive. Further, the upper limit may be made variable and varied according to a change in conditions.

Figure 3:
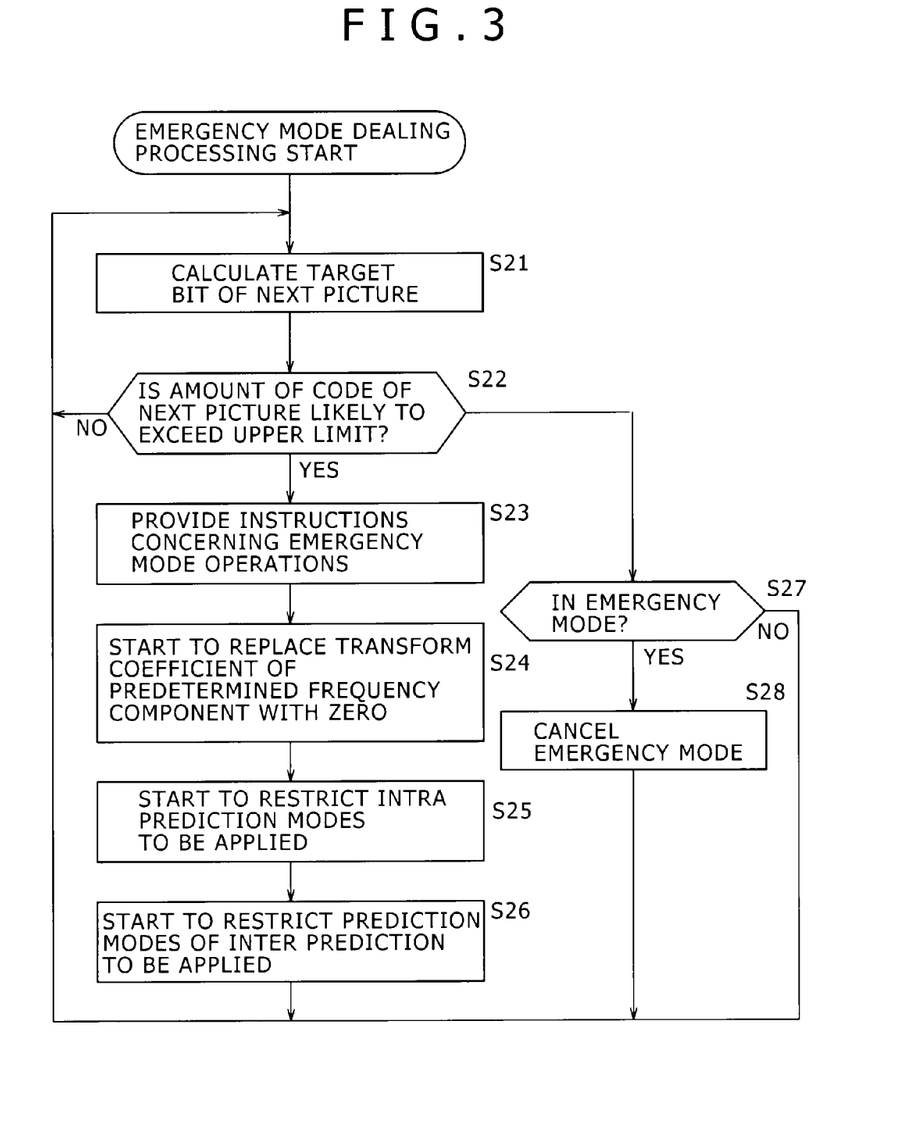
FIG. 3 is a flowchart for explaining emergency mode dealing processing performed by the image processing apparatus in FIG. 1.

If the emergency mode determining section 141 determines that the amount of code per picture is likely to exceed the predetermined upper limit, the code amount controlling section 142 controls encoding to suppress the amount of code by controlling processing performed by the orthogonal transducing section 114, the intra predicting section 125, or the mode determining section 127 in accordance with a method different from that of the rate controlling section 118, as will be described later with reference to FIG. 3.

The inverse quantizing section 120 inverse-quantizes the transform coefficient supplied from the quantizing section 115, and supplies it to the inverse orthogonal transducing section 121.

The inverse orthogonal transducing section 121 performs, on the transform coefficient supplied from the inverse quantizing section 120, an inverse orthogonal transform such as an inverse discrete cosine transform and an inverse Karhunen-Loeve transform. Thereby, the difference image is decoded. The inverse orthogonal transducing section 121 supplies the decoded difference image to the adder 122.

The adder 122 acquires from the mode determining section 127 the intra prediction image or the inter prediction image which is used to generate the difference image, and adds the difference image to the acquired intra prediction image or inter prediction image. Thereby, the original image is decoded. The adder 122 supplies the decoded image (hereinafter referred to as the decoded image as appropriate) to the deblocking filter 123.

The deblocking filter 123 performs, on the decoded image, deblocking processing for eliminating block distortion. The deblocking filter 123 supplies the image in which the deblocking processing is performed to the frame memory 124. Further, the deblocking filter 123 supplies the decoded image as it is without the deblocking processing as an image for use in the intra prediction to the frame memory 124.

The frame memory 124 stores the image supplied from the deblocking filter 123, as an image (hereinafter referred to as a reference image as appropriate) which is referred to in performing the intra prediction or the inter prediction.

The intra predicting section 125 performs the intra prediction, on each macroblock, for generating an intra prediction image for the original image, using encoded pixels adjacent to a macroblock in the same frame stored in the frame memory 124. Note that as described above, the pixels of the decoded image before the deblocking processing is performed are used in the intra prediction.

The motion predicting/compensating section 126 detects a motion vector for each macroblock in the original image with respect to the reference image, using the reference image of another frame stored in the frame memory 124, and motion-compensation is performed to the reference image, using the detected motion vector, thereby performing the inter prediction for generating the inter prediction image for the original image.

The mode determining section 127 determines a prediction mode to be applied to each macroblock, using for example, a Low Complexity Mode (high-speed mode).

Now, more specific description will be made of processing by the intra predicting section 125, the motion predicting/compensating section 126, and the mode determining section 127.

In the H.264/AVC standard, a plurality of prediction modes are defined as an intra prediction method and an inter prediction method.

Specifically, as for the intra prediction of luminance signals, three kinds which are 4×4 pixels (intra 4×4 mode), pixels (intra 8×8 mode, only in the case where High Profile is applied), and 16×16 pixels (intra 16×16 mode) are defined as units of blocks for the intra prediction. Further, in the intra 4×4 mode and the intra 8×8 mode, nine kinds of prediction modes 0 to 8 are defined as pixel value prediction directions. In the intra 16×16 mode, four kinds of prediction modes 0 to 3 are defined as pixel value prediction directions.

Further, as for the intra prediction of color difference signals, one kind which is 8×8 pixels is defined as a unit of a block for the intra prediction, and four kinds of prediction modes 0 to 3 are defined as pixel value prediction directions.

Moreover, as for the inter prediction, seven kinds which are 16×16 pixels, 16×8 pixels, 8×16 pixels, 8×8 pixels, 8×4 pixels, 4×8 pixels, and 4×4 pixels are defined as units of blocks for inter prediction. Further, as for the inter prediction of blocks belonging to a B (Bi-directional Predictive) slice, there are defined a previous prediction mode in which only previous (past) pictures are referred to on a temporal axis, a subsequent prediction mode in which only subsequent (future) pictures are referred to on the temporal axis, a bidirectional prediction mode in which both the previous and subsequent pictures are referred to on the temporal axis, and the like.

Moreover, as for the inter prediction of blocks belonging to a P (Predictive) slice or the B slice, there is defined a skip mode for suppressing the amount of code of information on the macroblock by using, as it is, the pixel value of the block of the reference image referred to by the motion vector. Further, as for the inter prediction of blocks belonging to the B slice, there is defined a direct mode for predicting the motion vector by using the motion vector of an encoded block.

The intra predicting section 125 calculates, for each macroblock, cost values Cost(Mode), by a following equation (1), concerning all the prediction modes of the intra prediction (hereinafter also referred to as intra prediction modes) which are applicable to each macroblock.

$$Cost(Mode)SA(T)D+SA(T)DO \quad (1)$$

Here, SA(T)D denotes an absolute sum of prediction errors which are the difference between the original image and the prediction image. Also, SA(T)DO is an offset value given to the SA(T)D and is an amount of data used for the transmission of header information added to the macroblock such as the motion vector.

The intra predicting section 125 supplies to the mode determining section 127, all the calculated cost values Cost (Mode), that is, information indicating the cost values Cost (Mode) for all the intra prediction modes which are applicable to the macroblocks.

Further, as will be described later with reference to FIG. 3, in an emergency mode, the intra predicting section 125 restricts the prediction modes for which the cost values Cost (Mode) are calculated, under the control of the code amount controlling section 119, thus restricting the intra prediction modes to be applied to each macroblock.

As with the intra predicting section 125, the motion predicting/compensating section 126 calculates, for each macroblock, the cost values Cost(Mode), by the above equation (1), concerning all the prediction modes of the inter prediction (hereinafter also referred to as inter prediction modes) which are applicable to each macroblock. The motion predicting/compensating section 126 supplies to the mode determining section 127, all the calculated cost values Cost (Mode), that is, information indicating the cost values Cost (Mode) for all the inter prediction modes which are applicable to the macroblocks.

The mode determining section 127 selects the prediction modes to be applied to each macroblock from the viewpoint of image quality and the amount of code, based on the cost values Cost(Mode) acquired from the intra predicting section 125 or the motion predicting/compensating section 126.

Further, as will be described later with reference to FIG. 3, in an emergency mode, the mode determining section 127 restricts the prediction modes to be applied to each macroblock, under the control of the code amount controlling section 119.

If the mode determining section 127 selects one of the intra prediction modes, the mode determining section 127 supplies information indicating the selected intra prediction mode to the intra predicting section 125. The intra predicting section 125 generates an intra prediction image based on the selected intra prediction mode, and supplies the generated intra prediction image to the mode determining section 127. Further, the intra predicting section 125 supplies information such as the selected prediction mode as information on the intra prediction of an intra-predicted macroblock, to the lossless encoding section 116.

Further, if the mode determining section 127 selects one of the inter prediction modes, the mode determining section 127 supplies information indicating the selected inter prediction mode to the motion predicting/compensating section 126. The motion predicting/compensating section 126 detects the motion vector and generates the inter prediction image based on the selected inter prediction mode, and supplies the generated inter prediction image to the mode determining section 127. Further, the motion predicting/compensating section 126 supplies information such as the selected prediction mode, the detected motion vector, and the number of the reference image (picture) as information on the inter prediction of the inter-predicted macroblock, to the lossless encoding section 116.

The mode determining section 127 supplies the intra prediction image or the inter prediction image generated based on the selected prediction mode to the adder 113 and the adder 122.

Figure 2:
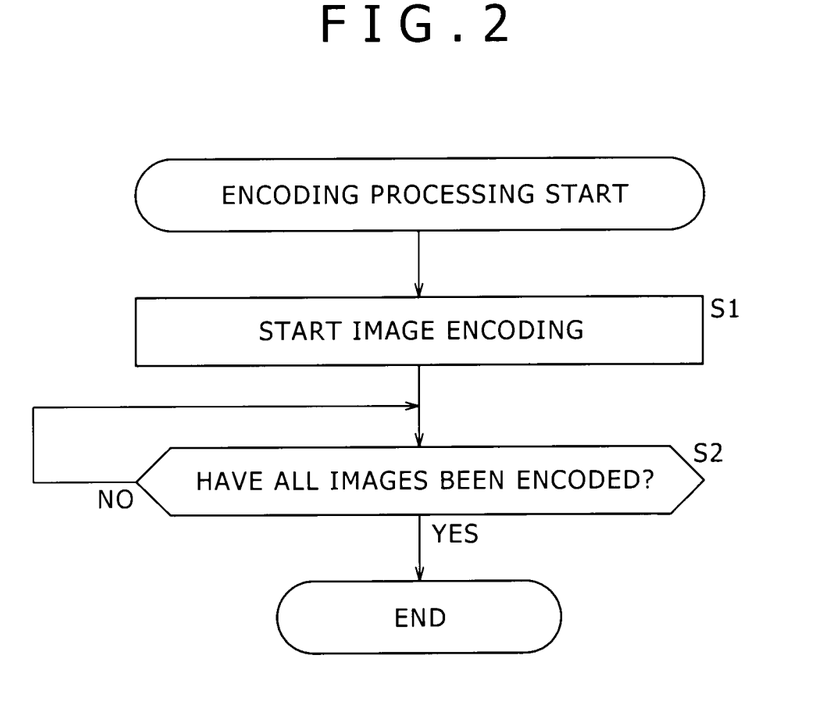
FIG. 2 is a flowchart for explaining encoding processing performed by the image processing apparatus in FIG. 1.

Next, referring to a flowchart in FIG. 2, description will be made of encoding processing performed by the image processing apparatus 101 in FIG. 1. Note that this processing is started, for example, when an image input from an outside to the image processing apparatus 101 is started.

In Step S1, the image processing apparatus 101 starts image encoding. That is, the sections in the image processing apparatus 101 start the operations described with reference to FIG. 1, thereby starting to encode the input image in accordance with the H.264/AVC system. Further, emergency mode dealing processing which will be described later with reference to FIG. 3 is started.

In Step S2, the image processing apparatus 101 determines whether all the images have been encoded. In Step S2, image encoding is performed until it is determined that all the images input from the outside have been encoded. If it is determined that all the images input from the outside have been encoded, the encoding processing ends.

Next, referring to a flowchart in FIG. 3, description will be made of emergency mode dealing processing performed by the image processing apparatus 101 during the encoding processing described above with reference to FIG. 2.

In Step S21, the rate controlling section 118 calculates the target bit of the next picture. Specifically, the rate controlling section 118 calculates the target bit of the next picture, based on the amount of code of the image stored in the storage buffer 117, for example, using a rate control method defined in the TM5. The rate controlling section 118 supplies information indicating the calculated target bit to the emergency mode determining section 141.

In Step S22, the emergency mode determining section 141 determines whether or not the amount of code of the next picture is likely to exceed an upper limit. The emergency mode determining section 141 determines that the amount of code of the next picture is likely to exceed the upper limit if the target bit acquired from the rate controlling section 118 exceeds a predetermined upper limit, and the processing proceeds to Step S23.

In Step S23, the code amount controlling section 142 provides instructions concerning emergency mode operations. Specifically, the emergency mode determining section 141 supplies information indicating that the amount of code of the next picture is likely to exceed the upper limit to the code amount controlling section 142. The code amount controlling section 142 provides instructions concerning emergency mode operations to the orthogonal transducing section 114, the intra predicting section 125, and the mode determining section 127.

In Step S24, the orthogonal transducing section 114 starts to replace the transform coefficient of a predetermined frequency component with zero, under the control of the code amount controlling section 142.

For example, in the case where T denotes the target bit of the next frame, $\Theta$ denotes the upper limit of the amount of code per picture, and Th1, Th2, and Th3 (in this regard, Th1<Th2<Th3) denote predetermined threshold values regarding the amount of code per picture, under the control of the code amount controlling section 142, if Th1<T−$\Theta$<Th2, the orthogonal transducing section 114 replaces the transform coefficient values of a predetermined frequency component excluding a direct-current (DC) component and another specific frequency component other than it with zero. If Th2≦T−$\Theta$<Th3, the orthogonal transducing section 114 replaces the transform coefficient values of a frequency component excluding the DC component with zero. If Th3≧T−$\Theta$, the orthogonal transducing section 114 replaces the transform coefficient values of all the frequency components including the DC component with zero. That is, a frequency component range in which the transform coefficient is replaced with zero is changed based on the target bit T. More specifically, the frequency component range in which the transform coefficient is replaced with zero is increased so that the amount of code is suppressed more as the target bit T increases.

Further, the frequency component range in which the transform coefficient is replaced with zero may be changed, for example, based on the type of a slice to which a macroblock belongs. For example, as for a macroblock belonging to an I (Intra) slice, the transform coefficient values of all the frequency components including the DC component may be replaced with zero, and as for a macroblock belonging to the P slice or the B slice, the transform coefficient values of the frequency component excluding the DC component may be replaced with zero. That is, the frequency component range in which the transform coefficient is replaced with zero is increased so that the amount of code is suppressed more in a macroblock belonging to the I slice with the amount of code tending to be larger than that of the P or B slice than in a macroblock belonging to the P or B slice.

Thus, the transform coefficient of the predetermined frequency component is replaced with zero, thereby suppressing the amount of code.

Note that the orthogonal transducing section 114 continues the replacement of the transform coefficient with zero until the emergency mode is canceled in Step S28 described later.

In Step S25, the intra predicting section 125 restricts intra prediction modes to be applied, under the control of the code amount controlling section 142. For example, under the control of the code amount controlling section 142, the intra predicting section 125 limits the pixel value prediction directions of the intra 4×4 mode, the intra 8×8 mode (only in the case where the High Profile is applied), and the intra 16×16 mode of luminance signals and color difference signals respectively to one kind. The intra predicting section 125 calculates only a cost value Cost(Mode) for the limited prediction direction, and stops calculating cost values Cost (Mode) for the other prediction directions. Thereby, in the intra prediction mode, the prediction modes of all the same prediction direction are applied. As a result, it becomes unnecessary to encode the prediction mode of each block, thus making it possible to suppress the amount of code.

Note that in this case, the prediction directions are unified into a DC mode (a prediction mode 2 in the luminance signals and a prediction mode 0 in the color difference signals), thereby unnatural directivity does not appear in an image, compared with a case where they are unified into another prediction mode. Thus image degradation can be suppressed.

Further, for example, as for the luminance signals, the cost value Cost(Mode) may be calculated only for the intra 16×16 mode in which a smaller amount of code occurs.

Moreover, the prediction modes to be applied may be restricted, for example, based on the type of a slice to which a macroblock belongs. For example, as for luminance signals of a macroblock belonging to the I slice, the cost value Cost (Mode) may be calculated only for the intra 16×16 mode, and as for luminance signals of a macroblock belonging to the P slice or the B slice, the cost values Cost(Mode) may be calculated for the intra 4×4 mode, the intra 8×8 mode (in the case of the High Profile), and the intra 16×16 mode, respectively. That is, a block which is a unit for performing the intra prediction is set to be larger so that the amount of code is suppressed more in a macroblock belonging to the I slice having the amount of code tending to be larger than that of the P or B slice than in a macroblock belonging to the P or B slice.

Thus, the intra prediction modes to be applied to each macroblock are restricted so that the amount of code in intra prediction is suppressed.

Note that the intra predicting section 125 continues the restriction of intra prediction modes until the emergency mode is canceled in Step S28 described later.

In Step S26, the mode determining section 127 restricts the inter prediction modes to be applied, under the control of the code amount controlling section 142.

For example, as for a macroblock belonging to the B slice, the mode determining section 127 restricts the choices of the inter prediction modes to a skip mode and a direct mode, under the control of the code amount controlling section 142. That is, the prediction modes to be applied to the macroblock belonging to the B slice are restricted to any one of the intra prediction mode limited in Step S25, the direct mode, and the skip mode.

Further, for example, as for a macroblock belonging to the P slice, the mode determining section 127 restricts the choices of the inter prediction modes to the skip mode, under the control of the code amount controlling section 142. That is, the prediction modes to be applied to the macroblock belonging to the P slice are restricted to either of the intra prediction mode limited in Step S25 and the skip mode.

Furthermore, as for a macroblock belonging to the I slice, since the inter prediction is not performed, the prediction modes to be applied are restricted to the intra prediction mode limited in Step S25.

Based on the cost value Cost(Mode), the mode determining section 127 selects a prediction mode to be applied to the macroblock, from among the restricted prediction modes.

Thereby, in the case where the inter prediction is selected, since the prediction mode is made to serve as the skip mode or the direct mode, the amount of code is suppressed.

Further, as for a macroblock belonging to the P or B slice, the intra prediction mode may be removed from the choices. Thereby, the skip mode of the inter prediction is applied to the macroblock belonging to the P slice, and the direct mode or the skip mode of the inter prediction is applied to the macroblock belonging to the B slice, so that the amount of code can be suppressed more.

Note that the mode determining section 127 continues the restriction of the inter prediction modes until the emergency mode is canceled in Step S28 described later.

After that, the processing returns to Step S21 to execute Step S21 and the subsequent steps.

In Step S22, if it is determined that the amount of code of the next picture is not likely to exceed the upper limit, the processing proceeds to Step S27.

In Step S27, the code amount controlling section 142 determines whether or not it is in the emergency mode. If it is determined that it is in the emergency mode, the processing proceeds to Step S28.

In Step S28, the code amount controlling section 142 cancels the emergency mode. Specifically, the code amount controlling section 142 instructs the orthogonal transducing section 114, the intra predicting section 125, and the mode determining section 127 to cancel the emergency mode. Thereby, the orthogonal transducing section 114, the intra predicting section 125, and the mode determining section 127 stop the emergency mode operations and resume regular operations.

After that, the processing returns to Step S21 to execute Step S21 and the subsequent steps.

In Step S27, if it is determined that it is not in the emergency mode, the processing returns to Step S21 to execute Step S21 and the subsequent steps.

As described above, if it is determined that the amount of code per picture is likely to exceed the predetermined upper limit, the transform coefficient of the predetermined frequency component is replaced with zero, the intra prediction modes to be applied are restricted, or the inter prediction modes to be applied are restricted, thereby making it possible to suppress the amount of code below the upper limit with more reliability.

Further, only in the emergency mode, the transform coefficient of the predetermined frequency component is replaced with zero, the intra prediction modes to be applied are restricted, and the inter prediction modes to be applied are restricted. Therefore, unnecessary image degradation is prevented.

Note that in the above explanation, examples are set that all processings of Steps S24 to S26 are executed in the emergency mode. However, only processing of one or two steps may be executed.

Further, while processes to be executed in respective steps of Steps S24 to S26 are selected based on the target bit value, the type of a slice to which a macroblock belongs, or the like as described above, the step to be actually executed may be selected from among Steps S24 to S26. For example, in the case where Th11, Th12, and Th13 (in this regard, Th11<Th12<Th13) denote predetermined threshold values regarding the amount of code per picture, if Th11<T−Θ<Th12, the intra prediction modes may be restricted to the DC mode in Step S25. If Th2≦T−Θ<Th3, the intra prediction modes may be restricted to the intra 16×16 mode at Step S25. If Th3≧T−Θ, the transform coefficient of the predetermined frequency component may be replaced with zero in Step S24.

Moreover, the determination processing in Step S22 in FIG. 3 is not limited to the above example, and may be performed based on a value other than the target bit.

Furthermore, in the above explanation, encoding is performed in accordance with the H.264/AVC system, however, the present invention is also applicable to the case where encoding is performed in accordance with any other encoding method such as the MPEG-4 (Moving Picture Coding Experts Group phase 4).

The above-described consecutive processings can be executed not only by hardware but also by software. In the case of using software to execute the consecutive processings, a program forming the software is installed from a program recording medium onto a computer incorporated in dedicated hardware, or e.g. a general-purpose personal computer that can execute various functions by installing various programs thereon.

Figure 4:
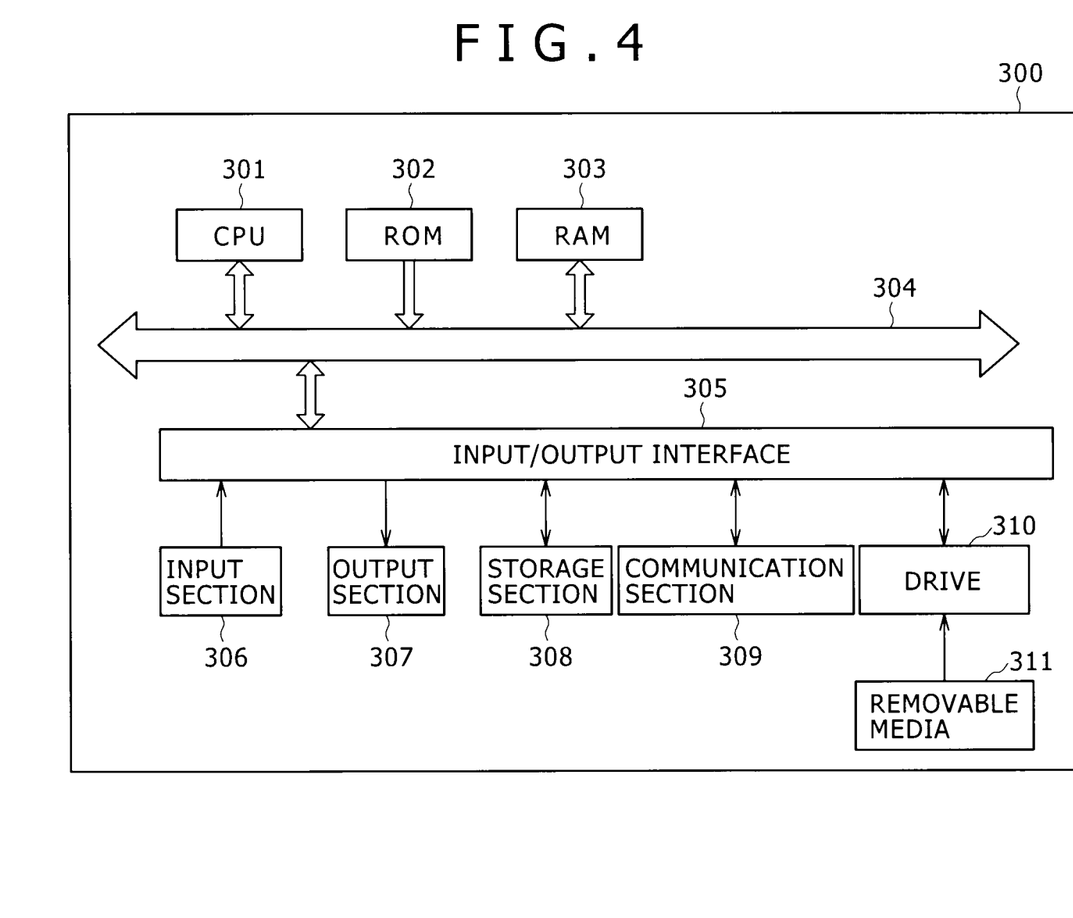
FIG. 4 is a block diagram showing an example of the configuration of a personal computer.

FIG. 4 is a block diagram showing an example of the configuration of a personal computer 300 which performs the above-described consecutive processings in accordance with programs. A CPU (Central Processing Unit) 301 performs various processings in accordance with programs stored in a ROM (Read Only Memory) 302 or a recording section 308. In a RAM (Random Access Memory) 303, programs performed by the CPU 301, data, and the like are stored as appropriate. The CPU 301, the ROM 302, and the RAM 303 are interconnected via a bus 304.

An input-output interface 305 is connected to the CPU via the bus 304. An input section 306 composed of a keyboard, a mouse, a microphone, and the like and an output section 307 composed of a display, a speaker, and the like are connected to the input-output interface 305. The CPU 301 performs various processings in accordance with an instruction input from the input section 306. Then, the CPU 301 outputs processing results to the output section 307.

The recording section 308 connected to the input-output interface 305 is composed of, e.g., a hard disk, and stores programs performed by the CPU 301 and various kinds of data. A communication section 309 communicates with an external apparatus via a network such as the Internet or a local area network.

Alternatively, a program may be acquired through the communication section 309 and stored in the recording section 308.

When removable media 311 such as a magnetic disk, an optical disk, a magneto-optical disk, or a semiconductor memory are mounted on a drive 310 connected to the input-output interface 305, the drive 310 drives them and acquires a program and data stored therein. The acquired program and data are transferred and stored into the recording section 308 as necessary.

As shown in FIG. 4, a program recording medium for storing programs which are installed in the computer and made executable by the computer includes the removable media 311 which are package media composed of the magnetic disk (including a flexible disk), the optical disk (including a CD-ROM (Compact Disc-Read Only Memory) and a DVD (Digital Versatile Disc)), the magneto-optical disk, the semiconductor memory, or the like; or the ROM 302 in which the programs are stored temporarily or permanently; and the hard disk constituting the recording section 308. The programs are stored in the program recording medium through the use of a wired or wireless communication medium such as the local area network, the Internet, or digital satellite broadcasting through the communication section 309 which is an interface such as a router or a modem as necessary.

Further, the steps used, in the present specification, to describe the programs to be stored in the program recording medium represent not only processing to be performed in a time-series manner in the order they are mentioned but also processing to be performed, not necessarily in a time-series manner, concurrently or individually.

Moreover, the embodiment of the present invention is not limited to the above embodiment, and various modifications can be made without departing from the scope and spirit of the invention.

The invention claimed is:

1. An image processing apparatus for encoding an image in accordance with an MPEG (Moving Picture Coding Experts Group) 4 system or an H.264/AVC (Advanced Video Coding) system, comprising:
   a determining unit to determine whether or not an amount of code per picture controlled by a bit rate controller will exceed a predetermined upper limit; and
   a controller to control encoding to suppress the amount of code in accordance with a method different from that of the bit rate controller if it is determined that the amount of code per picture exceeds the upper limit
   wherein the controller replaces, with zero, a transform coefficient of a predetermined frequency component among transform coefficients obtained by performing an orthogonal transform on a macroblock in a difference image which is a difference between an original image and a prediction image.

2. The image processing apparatus as set forth in claim 1, wherein the determining unit determines whether or not the amount of code per picture exceeds the predetermined upper limit, based on an amount of code allocated to each picture by the bit rate controller.

3. The image processing apparatus as set forth in claim 1, wherein the controller replaces a transform coefficient of a frequency component excluding a direct-current component with zero.

4. The image processing apparatus as set forth in claim 1, wherein the controller replaces transform coefficients of all frequency components including a direct-current component with zero.

5. The image processing apparatus as set forth in claim 1, wherein the controller changes a frequency component range in which a transform coefficient is replaced with zero, based on an amount of code allocated to each picture by the bit rate controller.

6. The image processing apparatus as set forth in claim 1, wherein the controller changes a frequency component range in which a transform coefficient is replaced with zero, based on a type of a slice to which a macroblock belongs.

7. The image processing apparatus as set forth in claim 1, wherein the controller controls a prediction mode which is applied to generate a prediction image.

8. The image processing apparatus as set forth in claim 7, wherein the controller applies a same prediction direction to each block which is a unit for performing an intra prediction.

9. The image processing apparatus as set forth in claim 8, wherein the controller applies a (DC) mode to each block.

10. The image processing apparatus as set forth in claim 7, wherein the controller applies an intra 16×16 mode in intra prediction of a luminance signal.

11. The image processing apparatus as set forth in claim 7, wherein the controller controls the size of a block which is a unit for performing an intra prediction, based on a type of a slice to which a macroblock belongs.

12. The image processing apparatus as set forth in claim 7, wherein the controller applies a skip mode as a prediction mode for a macroblock belonging to a P slice.

13. The image processing apparatus as set forth in claim 7, wherein the controller applies a skip mode or a direct mode as a prediction mode for a macroblock belonging to a B slice.

14. A non-transitory computer readable storage medium encoded with computer program instructions, which when executed by a processor cause a computer to execute image processing for encoding an image in accordance with an MPEG (Moving Picture Coding Experts Group) 4 system or an H.264/AVC (Advanced Video Coding) system comprising:

determining whether or not an amount of code per picture as controlled by a bit rate controller for controlling a bit rate will exceed a predetermined upper limit; and controlling encoding to suppress the amount of code in accordance with a method different from that of the bit rate controller if it is determined that the amount of code per picture will exceed the upper limit; and replacing, with a zero, a transform coefficient of a predetermined frequency component among transform components by the controlling encoding to perform a orthogonal transform on a macroblock in a difference image which is a difference between an original image and a prediction image.

* * * * *